United States Patent [19]

Aramaki et al.

[11] Patent Number: 5,491,789
[45] Date of Patent: Feb. 13, 1996

[54] DATA PROCESSING APPARATUS AND CONTROL CIRCUIT UNIT CONNECTED THERETO

[75] Inventors: Matsumi Aramaki; Yasukazu Isobe, both of Fujisawa; Tetsune Toyokawa, Yokohama, all of Japan

[73] Assignee: International Business Machines Corporation, Armonk, N.Y.

[21] Appl. No.: 683,466

[22] Filed: Apr. 10, 1991

[30] Foreign Application Priority Data

May 10, 1990 [JP] Japan ................... 2-118857

[51] Int. Cl.⁶ ................................. G06F 11/34
[52] U.S. Cl. ............. 395/183.01; 364/267; 364/DIG. 1
[58] Field of Search ................... 395/575, 325, 395/155, 118

[56] References Cited

U.S. PATENT DOCUMENTS

| | | |
|---|---|---|
| 4,038,640 | 7/1977 | Lee et al. ............... 364/200 |
| 4,692,870 | 9/1987 | Manduley . |
| 5,119,497 | 6/1992 | Freige et al. .............. 395/750 |
| 5,150,109 | 9/1992 | Berry . |
| 5,162,979 | 11/1992 | Anzelone et al. . |
| 5,163,833 | 11/1992 | Olsen et al. . |
| 5,289,339 | 2/1994 | Akashi et al. . |
| 5,297,000 | 3/1994 | Freige et al. . |

*Primary Examiner*—Robert W. Beausoliel, Jr.
*Assistant Examiner*—Albert Decady
*Attorney, Agent, or Firm*—Joscelyn G. Cockburn

[57] ABSTRACT

A circuit board for coupling a user terminal, including a display device, to a host computer is enhanced by adding a connector, an interface circuit and a switching device which respond to a control signal to attach a display control device on the circuit board or a display control device on another computer in which the circuit board is mounted so that information from the host computer or the other computer is displayed on the display device.

4 Claims, 7 Drawing Sheets

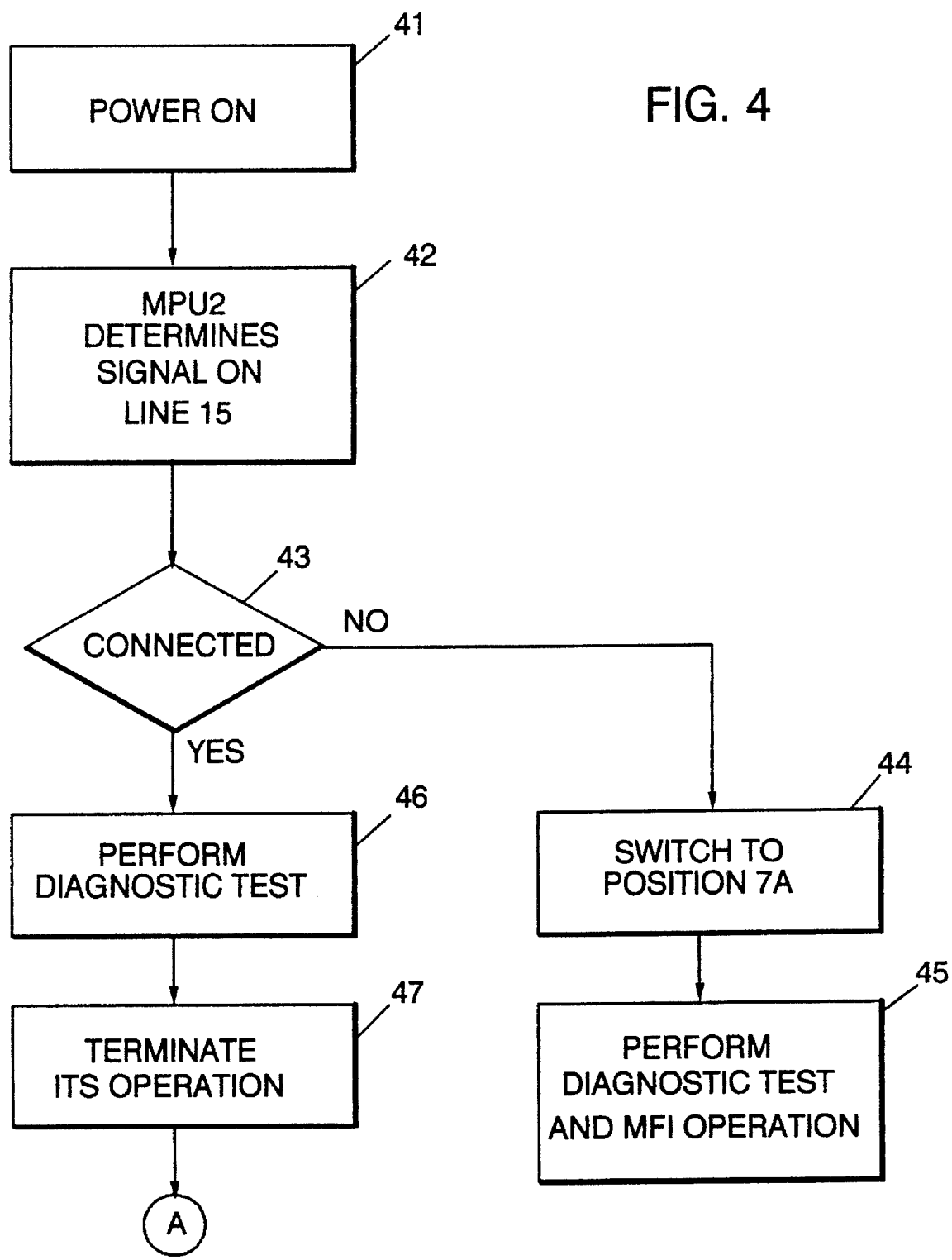

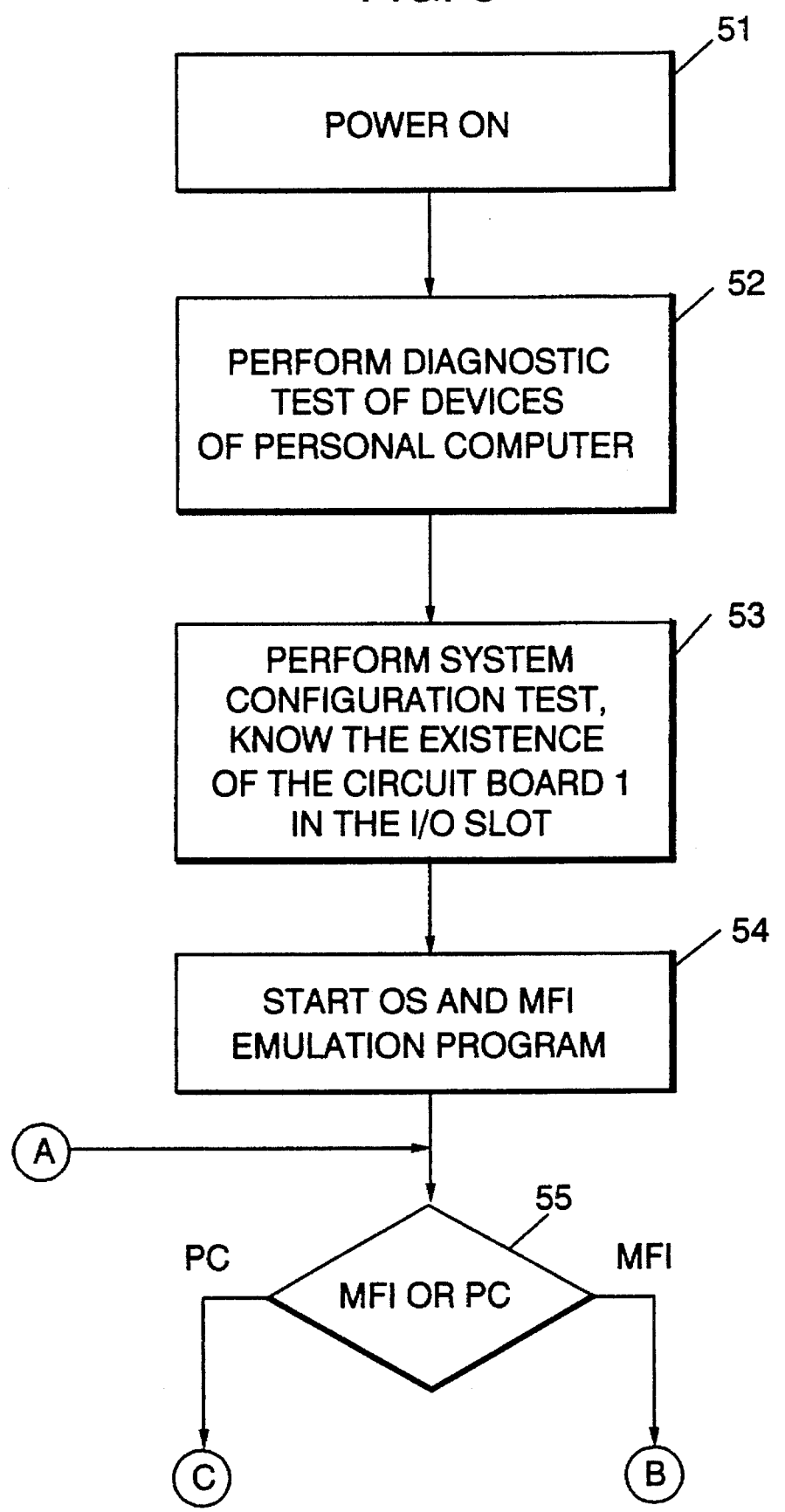

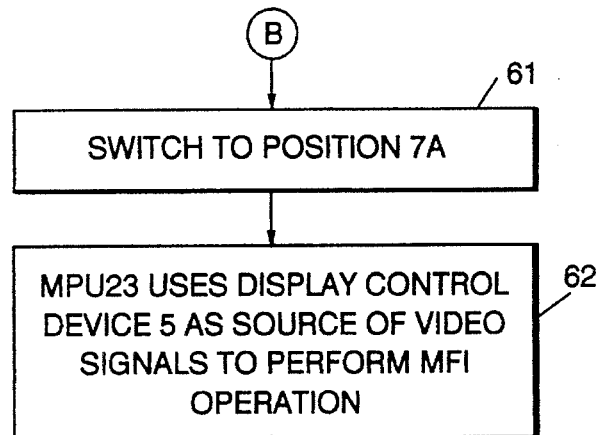
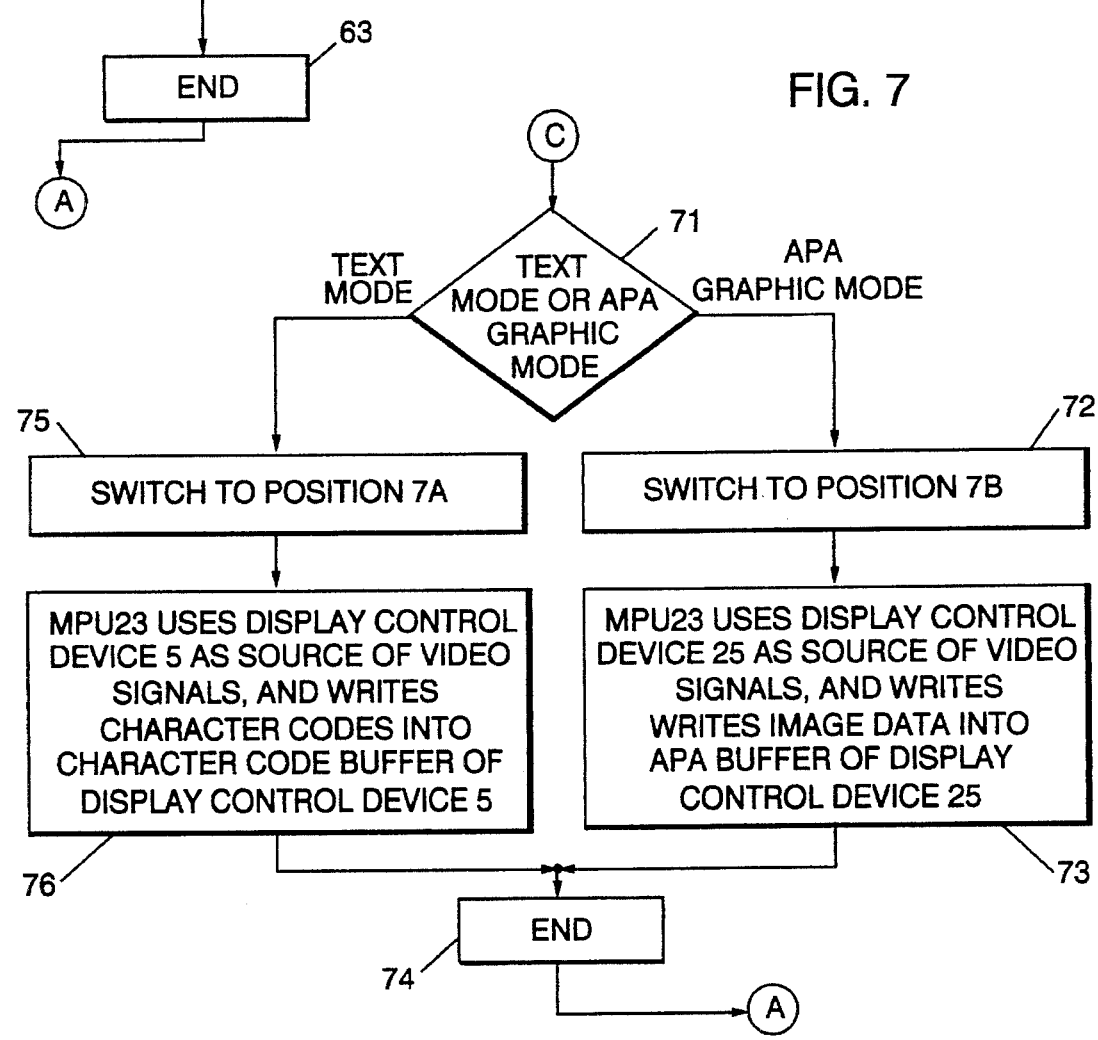

DATA PROCESSING APPARATUS AND CONTROL CIRCUIT UNIT CONNECTED THERETO

BACKGROUND OF THE INVENTION

1. Field of Invention

The invention relates to a control circuit board of a terminal device of a host processor and a data processing apparatus, such as a personal computer or a workstation wherein the control circuit board is connected to an input-output connecting slot of the data processing apparatus.

2. Prior Art and Problems

Display systems are typically classified into two types. The display system of the first type is a system called as a main frame interactive (MFI) terminal device or a host connected terminal, as shown in FIG. 8. The MFI terminal device basically includes a control unit 80, a keyboard 81 and a display device 82 which includes a power supply for the control unit 80 and the display device 82 itself. A printer is also connectable to the control unit 80, but the printer is not shown in the FIG. 8 for simplifying the drawing. The control unit 80 includes a microprocessor (MPU) 83, a memory 84, a communication control device 85, a display control device 86 and a system bus 87. The communication control device 85 is connected to a host processor, not shown, through the communication line 87. The operation of the MFI terminal device is controlled by the host processor. More particularly, the host processor decodes an application program to send commands, data, addresses, etc. to the MPU 83 through the communication line 87 and the communication control device 85, whereby the MFI terminal device is directly controlled by the host processor, so that a relatively low performance MPU 83 is used in the MFI terminal device. The host processor requires to display high resolution characters of high quality in various character display modes, such as 80×24 character mode, 80×32 character mode, 80×43 character mode, 132×27 character mode, etc. so that a relatively high performance display control device 86 and a high resolution display device 82 are used in the MFI terminal device.

The keyboard 81, the communication line 87 and the display device 82 are connected to the control unit 80 by connectors 88A, 88B and 88C.

The display system of the second type is a system called as a personal computer or a workstation, as shown in FIG. 9. The personal computer basically includes a control unit 90, a display device 91 which includes a power supply for the control unit 90 and the display device itself, a keyboard 92 and a printer 93. The control unit 90 includes an MPU 94, a memory 95, a display control device 96, a keyboard control device 97, a floppy disk control device 98, a hard disk control device 99, a parallel port control device 100, a floppy disk driver (FDD) 101 and a hard disk driver (HDD) 102. The display device 91, the keyboard 92, and the printer 93 are connected to the control unit 90 by connectors 103A, 103B and 103C.

The MPU 94 processes various application programs loaded from the floppy disk drive 101, so that a relatively high performance MPU 94 is used in the personal computer. However, a relatively low resolution display control device 96 and a relatively low resolution display device 91 are used in the personal computer since the application program requires 80×25 character mode in maximum in the character mode in the personal computer.

The most of customers install the MFI terminal device in their office at the first step, then install the personal computer for personal use. In other words, the customers separately install the MFI terminal device shown in the FIG. 8 and the personal computer shown in the FIG. 9, so that the cost becomes high and a large space is required in their office. The inventors of the present invention were aware of the above problems, and made the present invention based upon the awareness. The inventors also fixed their eyes upon that the recent control unit 80 of the MFI terminal device could be mounted on a single small circuit board due to the recent technical progress, and the personal computer had input-output connecting (I/O) slots into which various optional circuit boards were connected.

The starting point of the present invention that the circuit board of the control unit 80 of the MFI terminal device is modified to be connectable to the I/O connecting slot of the personal computer is borne by the inventors based upon the above background.

Technical concepts connecting an additional circuit board into the I/O connecting slot of the personal computer have been well known, as shown in Japanese Patent Application 62-94176 (Published Unexamined Patent Application No. 63-259708). The Patent Application No. 62-94176 discloses that an extended function circuit board is connected to a system bus of a personal computer through interface. The personal computer performs basic functions. When the extended function circuit board is connected to the personal computer, the circuit board exchanges programs and data with the personal computer to perform the additional functions. The invention does not reside in such broad concept, but a definite structure as described hereinafter. And, such definite structure is not shown or suggested in the Patent Application 62-94176.

SUMMARY OF THE INVENTION

In accordance with the present invention, a control circuit unit including a microprocessor, a display control device, a communication control device connected to a host processor through a communication line, and a system bus connecting the microprocessor, the display control device, and the communication control device, further comprises:

a connector connectable to an input/output (I/O) connecting slot of a data processing apparatus;

an interface circuit connected between the system bus and the connector; and a switching means having first input connected to the display control device, second input connected to video signal connector element of the connector, and an output connectable to a display device; and the display control device controls the switching means.

The connector includes an input connector element connected to the microprocessor of the control circuit unit, and the microprocessor, at a power on, determines as to whether an inhibit signal is supplied to the input connector element, or not, and terminals, if detects the inhibit signal, its operation after performing a diagnostic test of the control circuit unit.

The inhibit signal is supplied from the data processing apparatus through the I/O connecting slot to which the connector is connected.

The microprocessor of the control circuit unit detects non-existence of the inhibit signal at the input connector element to supply the display control device a control signal for connecting the first input to the output of the switching means and to perform the control operation for the display control device and the communication control device.

The data processing apparatus in accordance with the present invention comprises:

a control unit which includes first microprocessor, first display control device, I/O connecting slot, and first system bus connecting the first microprocessor, the first display control device, and the I/O connecting slot; and a circuit board which includes a communication control device, second microprocessor, second display control device, second system bus connecting the communication control device, the second microprocessor, and the second display control device, a connector connected to the I/O connecting slot of the control unit, and an interface circuit connected between the connector and the second system bus; and the first microprocessor controls the operation of the circuit board through the connector and the interface circuit.

The circuit board includes the switching means having first input connected to the second display control device, second input connected to video signal connector element of the connector, and an output connected to a display device, and the second display control device responds a control signal sent from the first microprocessor to control the switching means.

The connector includes an input connector element connected to the second microprocessor, and the second microprocessor, at powered on, determines as to whether the inhibit signal is supplied to the input connector element, or not, and terminates, if it detects the inhibit signal, its operation after performing a diagnostic test of the circuit board.

A high resolution display device is connected to the output of the switching means, the first microprocessor, in a text mode, supplies a control signal to the second display control device for connecting the first input to the output of the switching means to supply high resolution video signals generated by the second display control device to the high resolution display device.

The first microprocessor supplies character codes to a character code buffer of the second display control device in the text mode.

The first microprocessor, in an all point addressable graphic mode, supplies a control signal to the second display control device for connecting the second input to the output of the switching means to supply low resolution video signal generated by the first display control device to the high resolution display device.

The first microprocessor supplies image data to the all point addressable buffer in the first display control device in the all point addressable graphic mode.

BRIEF DESCRIPTION OF THE DRAWINGS

FIG. 4 shows the flow chart of the operation of the MPU of the control circuit board.

FIGS. 5, 6 and 7 show the flow chart of the operation of the MPU of the control unit of the personal computer.

DESCRIPTION OF THE PREFERRED EMBODIMENT

Figure 1:
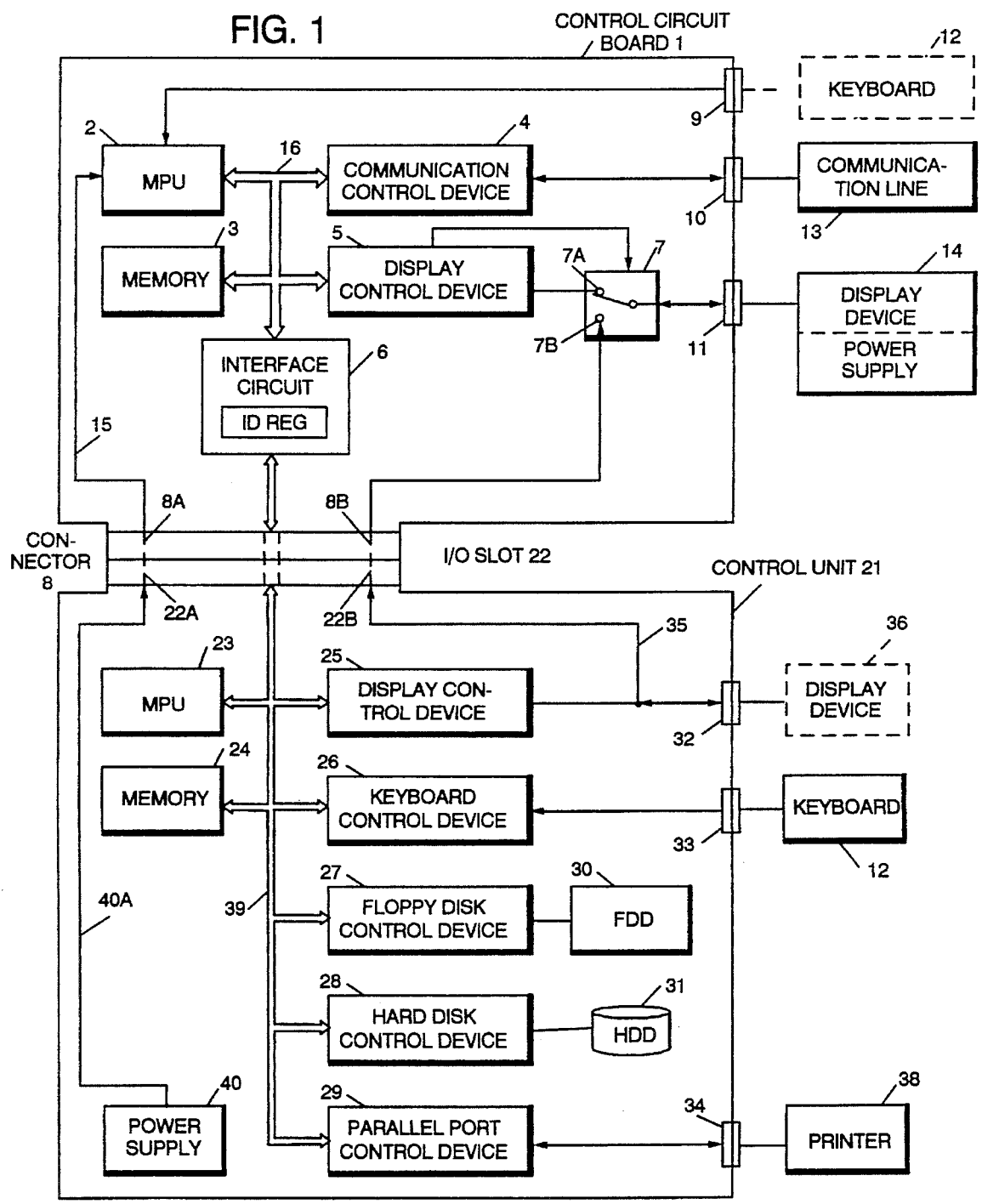
FIG. 1 shows the control circuit board of the MFI terminal device and the control unit of the personal computer in accordance with the present invention.

FIG. 1 shows an embodiment of the present invention. The control circuit unit or the control circuit board 1 for the MFI terminal device includes a low performance MPU 2, a memory 3, a communication control device 4, a high performance display control device 5, an interface circuit 6, a switch 7, and a connector 8. The MPU 2, the memory 3, communication control device 4 and the display control device 5 are originally provided on the circuit board 1 for performing the MFI operation. The interface circuit 6, the switch 7 and the connector 8 and the control operation for them are added in accordance with the present invention. Input/output (I/O) connectors 9, 10 and 11 are provided on the circuit board 1.

A system bus 16 connects the MPU 2, the memory 3, the communication control device 4, the display control device 5 and the interface circuit 6 to send the commands, data and various control signals among them, as well known in the art.

A control unit 21 of the personal computer or workstation includes an input/output (I/O) connecting slot 22, a high performance MPU 23, a memory 24, a low performance display control device 25, a keyboard control device 26, a floppy disk control device 27, a floppy disk driver (FDD) 30, a hard disk control device 28, a hard disk driver (HDD) 31, a parallel port controlled device 29, I/O connectors 32, 33 and 34, a power supply 40, and a system bus 39, as well known in the art. Although plural I/O connecting slots 22 are actually provided, only one slot 22 is shown in the FIG. 1.

The reasons for mounting the low performance MPU 2 on the MFI circuit board 1 are that, in the MFI operation, a host processor, not shown, connected through a communication line 13 processes various application programs and sends the MPU 2 the commands, data, address and control signals under which the MPU 2 performs the control operation of the control circuit board 1.

The reasons for mounting the high performance MPU 23 in the personal computer are that the MPU 23 is required to process various application programs and to control the various devices in the personal computer.

Both the display control devices 4 and 25 basically include a character code buffer, an all point addressable (APA) buffer, a character generator, CRT (cathode ray tube) controller, etc., as well known in the art. The display control devices 4 and 25 generate video signals for the display device. The performance of the display control device 4 is high, while the performance of the display control device 25 is low.

The reasons for providing the MFI circuit board 1 with the high performance display device 5 are that, in the MFI operation, characters or graphic images are displayed in the various modes. The characters, for example, is displayed in the various modes combining various resolution and the number of character boxes specified by the MPU 2, e.g. 80×20, 80×32, 80×43, 130×24 characters. The display control device 5 is required to generate one of the various kinds of the modes; hence the performance of the display control device 5 is high.

The reasons for providing the personal computer with the low performance display control device 25 are that, in the personal computer, the low resolution display device 36 is used, and the number of display modes is limited due to the low resolution of the display device, e.g. 640×480 dots, 640×200 dots. For example, the text image and the graphic image are displayed in the same resolution; thus the performance of the display control device 25 is low.

The communication control device 4 is well known in the art, and operates as a communication adapter between the communication line 13 and the system bus 16.

The interface circuit 6 operates to couple the system bus 16 and the system bus 39.

The keyboard control device 26, the floppy disk control device 27, the FDD 30, the hard disk control device 28, the HDD 31 and the parallel port control device 29 are well known in the art and not described.

Figure 2:
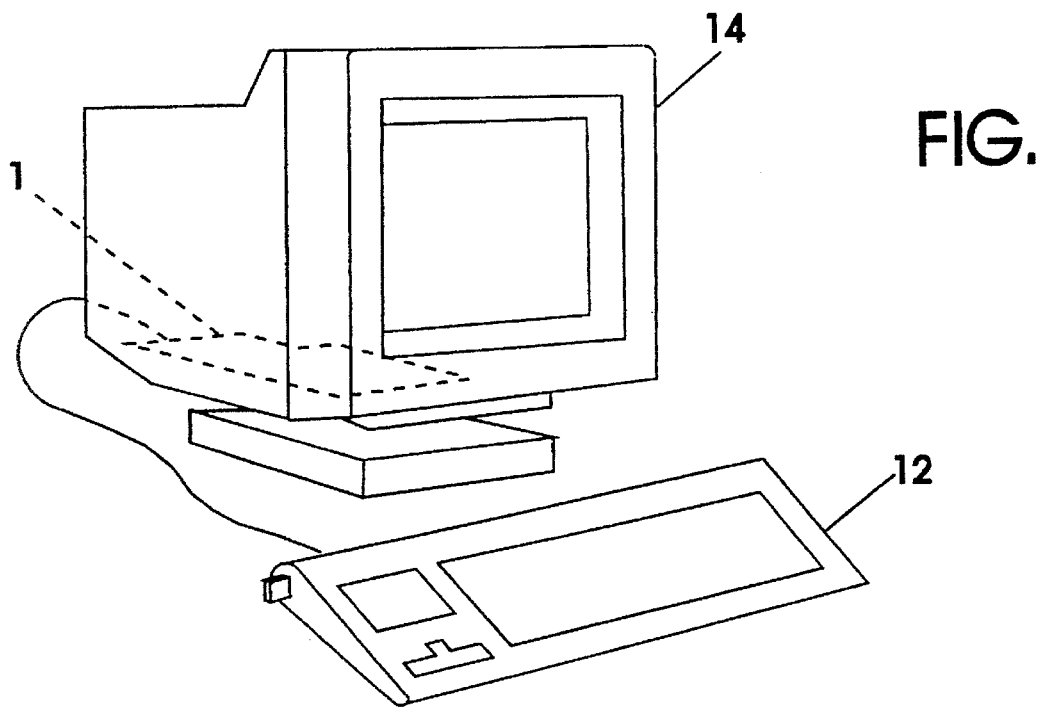
FIG. 2 shows the control circuit board mounted in the display device for operating as the control device of the MFI terminal device.
Figure 3:
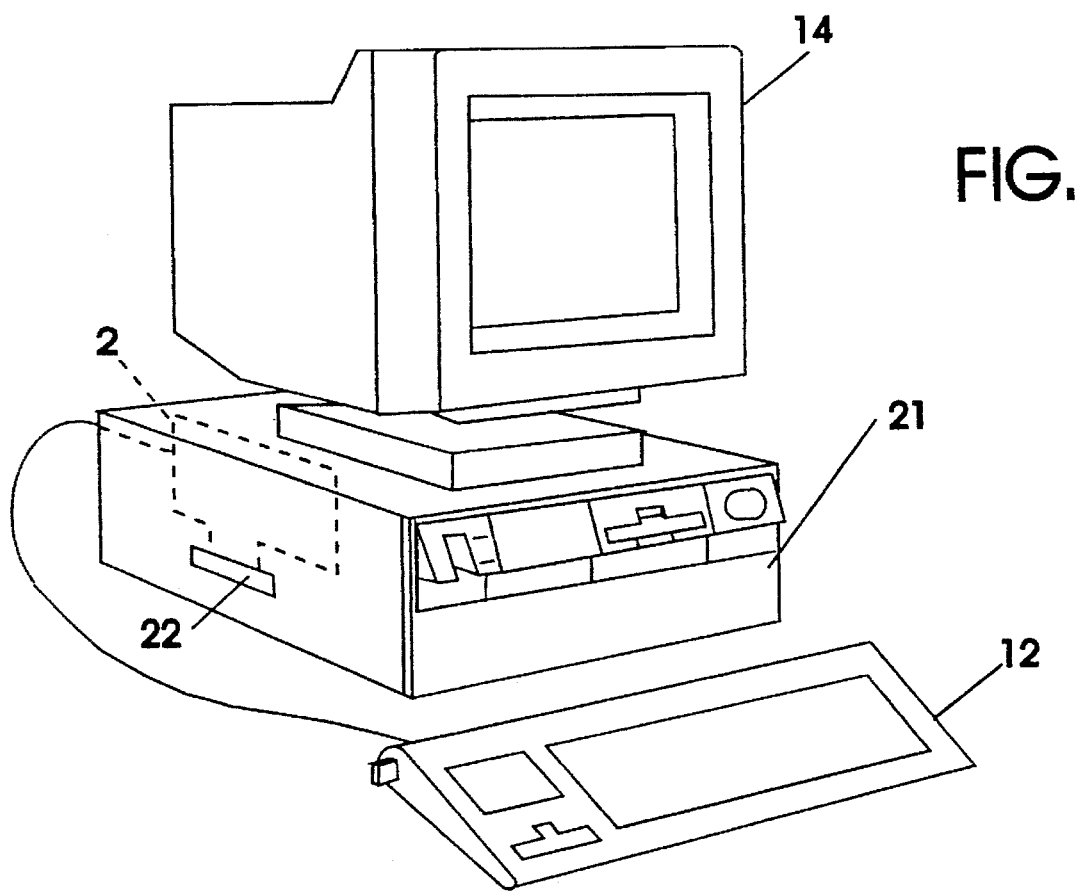
FIG. 3 shows the control circuit board connected to the I/O connecting slot of the control unit of the personal computer for operating as the adapter circuit of the personal computer.
Figure 8:
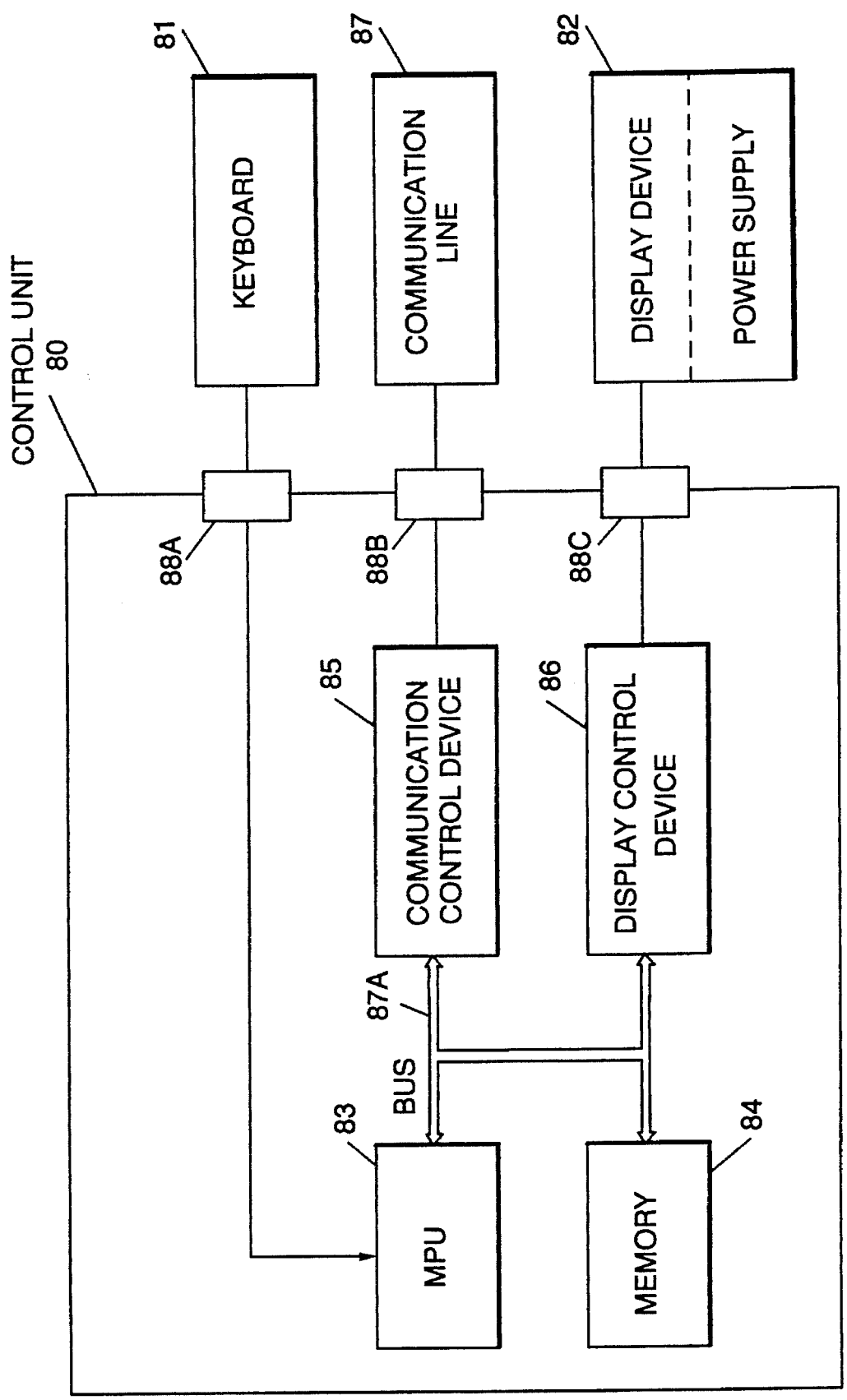
FIG. 8 shows the prior MFI terminal device.
Figure 9:
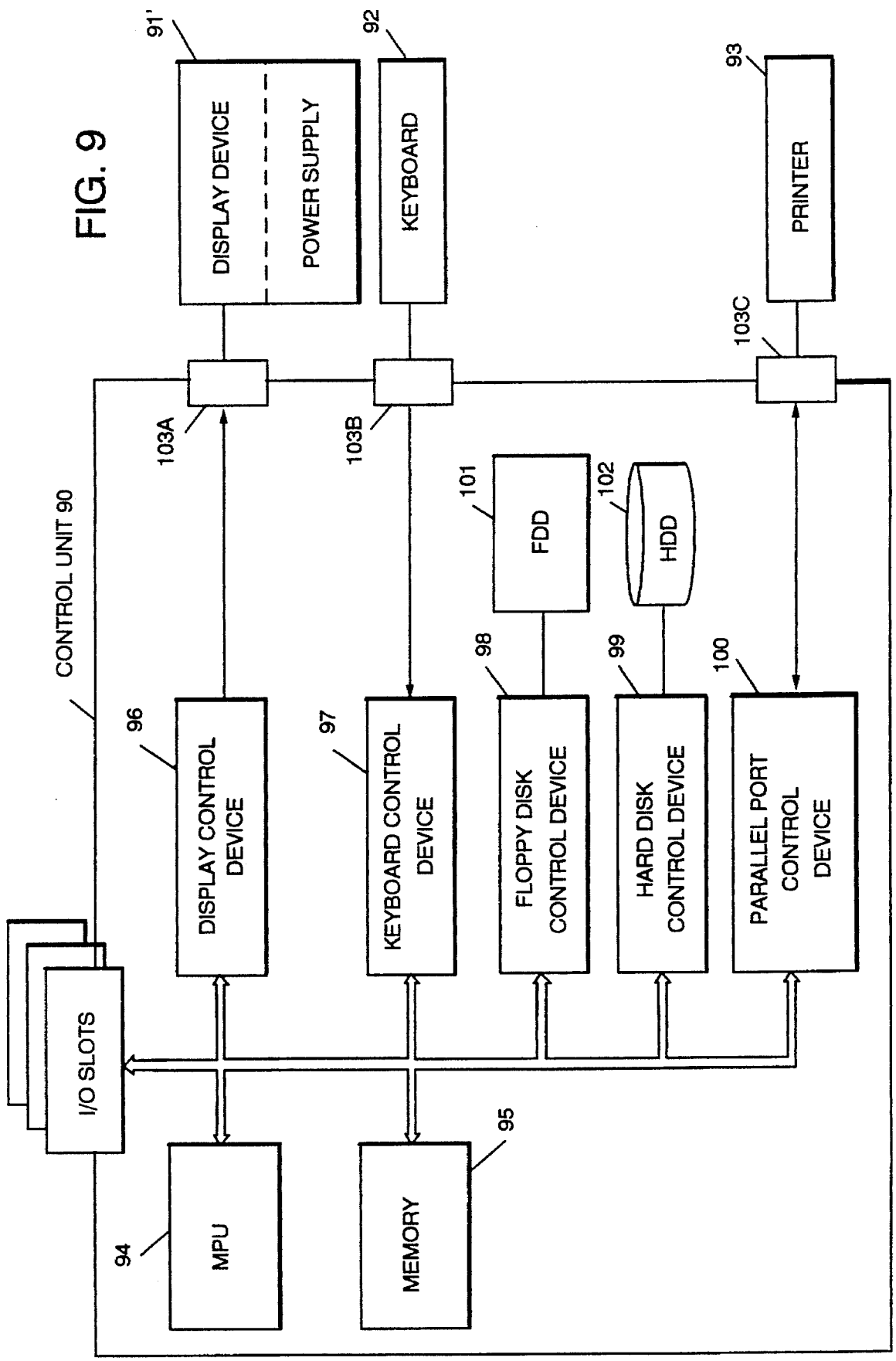
FIG. 9 shows the prior personal computer.

The control circuit board 1 in accordance with the present invention operates as a main control unit of the MFI terminal device when the circuit board 1 is mounted in the high resolution display device 14, as shown in FIG. 2, and operates as an adapter or extended function circuit board when the circuit board 1 is connected to the I/O connecting slot 22 of the personal computer, as shown in FIG. 3.

When the control circuit board 1 operates as the main control unit of the MFI terminal device, as shown in the FIG. 2, the keyboard 12 is connected to the connector 9 of the circuit board 1. The display device 14 includes a power supply for the circuit board 1 and the display device 14.

When the user wants to add the functions of the personal computer and the functions of the MFI terminal device, the user is required to buy only the control unit 21 and a printer 38 as additional units, to disconnect the keyboard 12 from the connector 9 of the control circuit board 1, and to connect the keyboard 12 to the connector 33 of the control unit 21, as shown in the FIGS. 1 and 3. In this case, the user does not necessarily have to buy the lower resolution display device 36. Further, the character mode of high resolution is used in the MFI mode, so that the characters of the high quality are displayed.

Describing the operation of the MPU 2 on the control circuit board 1 with referring to FIG. 4, a power is turned on in a block 41, and the operation proceeds to a block 42, wherein the MPU 2 determines as to whether a signal exists on the line 15 from the connector 8. The power supply 40 of the control unit 21 always applies a voltage signal, such as +5 V signal, to a connector element 22A through a line 40A. The voltage signal is supplied to the MPU 2 through a connector element 8A and a line 15 when the connector 8 of the circuit board 1 is connected to the I/O connecting slot 22. If the MPU 2 senses the voltage signal on the line 15, the MPU 2 detects in a block 43 that the circuit board 1 is connected to the I/O connecting slot 22 of the control unit 21 of the personal computer. And, the operation proceeds to a block 46 wherein the MPU 2 performs a diagnostic test of the devices on the circuit board 1, and the MPU 2 stops its operation in a block 47. The operation of the circuit board 1 is connected to FIG. 5, as shown by a capital "A".

If the answer of the block 43 is NO, the operation proceeds to a block 44 wherein the MPU 2 generates a control signal to the display control device 5, which responds the control signal to control the switch 7 to connect its input terminal 7A to its output and the connector 11. The operation proceeds to a block 45 wherein the MPU 2 performs the diagnostic test and the MFI operation.

The FIG. 5 shows the operation of the MPU 23 in the control unit 21 of the personal computer. A power is turned on in a block 51 and the operation proceeds to a block 52, wherein the MPU 23 performs the diagnostic test of devices of the personal computer. And, the operation proceeds to a block 53, wherein the MPU 23 performs a system configuration test. In the system configuration test, the MPU 23 checks which type of circuit board is connected to the I/o connecting slot. It is assumed in the exemplary embodiment that only the circuit board 1 is connected to the I/O connecting slot 22. The MPU 23 accesses an identifications register in the interface circuit 6 in the control circuit board 1 through the system bus 39, the I/O connecting slot 22 and the connector 8. The identification register stores data representing an identification number of the control circuit board 1. The MPU 23 knows the connection of the circuit board 1 into the I/O connecting slot 22 by reading the data representing the identification number. And, the MPU 23 starts an operating system (OS) and a program for using the MFI mode in a block 54. The operation proceeds to a block 55, which determines which of the MFI operation and the personal computer (PC) operation has been selected. If the answer of the block 55 is MFI, the operation proceeds to a block 61 in FIG. 6. If the answer is PC, the operation proceeds to a block 71 in FIG. 7.

The selection of the MFI operation or the personal computer operation in the block 55 is made by commands which are generated in response to the operator's depressing the keys of the keyboard 12.

Referring to the block 61 in the FIG. 6, the MPU 23 sends a control signal for switching the switch 7 to the position 7A, to the display control device 5 through the system bus 39, the I/O connecting slot 22, the connector 8 and the interface circuit 6. The display control device 5 responds the control signal to position the switch 7 to the position 7A. The MPU 23, in a block 62, uses the display control device 5 as the source of the video signals in the text mode and the graphic mode of the MFI operation. The video signals are supplied to the high resolution display device 14. The MPU 23 responds the commands, data and control signals supplied from the host processor through the communication line 13, the communication control device 4, the system bus 16, the interface circuit 6, the connector 8, the I/O connecting slot 22 and the system bus 39, and performs the MFI operation of the MPU 2. The MPU 23 supplies the character codes to the character code buffer of the display control device 5 in the text mode.

The operation in the FIG. 6 is the MFI operation, but the operation is controlled by the MPU 23 in the personal computer. The MPU 23, therefore, emulates the operation of the MPU 2. When the operation is terminated in a block 63, the operation returns to the block 55 in the FIG. 5.

Referring to the FIG. 7 showing the operation of the personal computer, the MPU 23 determines, in the block 71, which of the text mode and the APA (All Point Addressable) graphic mode is selected. If the APA graphic mode is selected, the MPU 23 supplies the display control device 5 a control signal for switching the switch 7 to the position 7B, in a block 72. The MPU 23, in a block 73, uses the display control device 25 as the source of the video signals, generates bit data representing the graphic image displayed on the display device 14, and writes the bit data into the APA buffer of the display control device 25. In the APA graphic mode, the MPU 23 processes the application program of the APA mode. The APA graphic mode includes resolution modes, such as 640×480 dot mode, 640×200 dot mode. The low resolution video signals generated by the display control device 25 is supplied to the high resolution display device 14 through the line 35, the I/O connecting slot 22, the connector 8 and the switch 7. When the APA graphic mode is terminated in a block 74, the operation returns to the block 55 in the FIG. 5.

If the text mode is selected in the block 71 in the FIG. 7, the MPU 23 supplies the display control device 5 a control signal for switching the switch 7 to the position 7A, in a block 75. The display control device 5 responds the control signal to generate a signal for switching the switch 7 on the line 17. In a block 76, the MPU 23 uses the display control device 5 as the source of the video signals, and writes the character codes into the character code buffer in the display control device 5. When the text mode is terminated in the block 74, the operation returns to the block 55 in the FIG. 5.

As apparent from the description hereinbefore, when the control circuit board 1 of the MFI terminal device is connected to the control unit 21 of the personal computer through the connector 8 and the I/O connecting slot 22, the MPU 2 of the control circuit board 1 terminates its control function after performing the diagnostic test in response to the inhibit signal supplied from the control unit 21, and the MPU 23 of the personal computer controls both the control circuit board 1 and the control unit 21. The display control device 5 of the control circuit board 1 is controlled by the MPU 2 when the control circuit board 1 is not connected to the control unit 21, and is controlled by the MPU 23 of the control unit 21 when the control circuit board 1 is connected to the control unit 21. When the control circuit board 1 is connected to the control unit 21, the MPU 23 detects which of the MFI mode and the PC mode is selected, to supply the control signal to the display control device 5 of the control circuit board 1 for controlling the switch 7, so that the composite video signal in the APA graphic mode of the PC mode is supplied from the display control device 25 to the display device 14 through the line 35 and the position 7B of the switch 7, and the composite video signal in the MFI mode and the text mode of the PC mode is supplied from the display control device 5 to the display device 14 through the position 7A of the switch 7.

E. EFFECTS OF INVENTION

The invention realizes the integration of the control circuit board of the MFI terminal device into the control unit of the personal computer, whereby the space in the office is saved.

When the user wants to upgrade from the MFI terminal device to the personal computer, the user is required to buy the control unit 21 as additional basic unit.

In the MFI emulation mode in the personal computer, the characters of high character quality are displayed.

We claim:

1. In a control circuit board used to couple a user terminal to a first data processing apparatus and said control circuit board including a microprocessor, a display control device, a communication control device connectable to the first data processing apparatus through a communication line, and a system bus connecting said microprocessor, said display control device and said communication control device, a control circuit unit for allowing the control circuit board to access information from the first data processing apparatus and a second data processing apparatus; said control circuit unit comprising:

a connector, operatively coupled to the control circuit board, for mounting in an input/output connecting slot of the second data processing apparatus; said connector includes an input connector element for transmitting an inhibit signal connected to said microprocessor; and said microprocessor, at powered on, samples the connector element to determine if the inhibit signal is supplied to said input connector element and terminating its operation after performing a diagnostic test of said control circuit unit; if said inhibit signal is detected;

an interface circuit means for coupling the system bus of the control circuit board with a system bus of the second data processing apparatus; said interface circuit means connected between said system bus and the connector; and a switching means operatively coupled to the connector and the display control device; said switching means responsive to a control signal to enable information provided from the first data processing apparatus through the control circuit board or from the second data processing apparatus to be displayed.

2. Control circuit unit according to claim 1, wherein said inhibit signal is supplied from said second data processing apparatus through said input/output connecting slot to which said connector is connected.

3. Control circuit unit according to claim 1, wherein said microprocessor detects non-existence of the inhibit signal at said input connector element to supply said display control device a control signal for connecting said first input to said output of said switching means and to perform the control operation for said display control device and said communication control device.

4. A data processing apparatus comprising:

a control unit including first microprocessor, first display control device, an input/output connecting slot, and first system bus connecting said first microprocessor, said first display control device and said input/output connecting slot; with said control unit periodically generating and forwarding an inhibit signal to said input/output connecting slot, and a circuit board including a communication control device, second microprocessor, second display control device, said system bus connecting said communication control device, said second microprocessor and said second display control device, a connector connected to said input/output connecting slot of said control unit, said connector includes an input connector element connected to said second microprocessor, and said second microprocessor, at powered on, monitoring the input connector element to determine as to whether said inhibit signal is supplied to said input connector element, or not and to terminate, if said inhibit signal is detected, its operation after performing a diagnostic test of said circuit board; and an interface circuit for coupling the first system bus and the second system bus connected between said connector and said second system bus; wherein said first microprocessor controlling the operation of the control unit and the operation of said circuit board through said connector and said interface circuit.

* * * * *